US009838542B1

(12) United States Patent
Kirchhoff et al.

(10) Patent No.: US 9,838,542 B1
(45) Date of Patent: *Dec. 5, 2017

(54) METHODS AND SYSTEMS FOR MANAGING COMMUNICATIONS

(71) Applicant: CALLWAVE COMMUNICATIONS, LLC, Brookline, MA (US)

(72) Inventors: Leland W. Kirchhoff, Santa Barbara, CA (US); David S. Trandal, Santa Barbara, CA (US); David F. Hofstatter, Santa Barbara, CA (US)

(73) Assignee: CALLWAVE COMMUNICATIONS, LLC, Brookline, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/299,342

(22) Filed: Oct. 20, 2016

Related U.S. Application Data (63) Continuation of application No. 14/014,855, filed on Aug. 30, 2013, now Pat. No. 9,491,297, which is a
(Continued)

(51) Int. Cl.
*H04M 1/64* (2006.01)
*H04M 3/533* (2006.01)
(Continued)

(52) U.S. Cl.
CPC .. *H04M 3/53333* (2013.01); *G06F 17/30864* (2013.01); *G06Q 30/0267* (2013.01);
(Continued)

(58) Field of Classification Search
CPC ................................................. H04M 3/53333
(Continued)

(56) References Cited

U.S. PATENT DOCUMENTS 5,526,407 A  6/1996 Russell
5,533,106 A  7/1996 Blumhardt
(Continued)

FOREIGN PATENT DOCUMENTS

EP  1 120 954    8/2001
JP  10-513632   12/1998
(Continued)

OTHER PUBLICATIONS

(2006) "Entrepreneur of the Year awards—benchmark to the global economy," *The Business Magazine* (*Thames Valley*), Web Site: http://www.eoy.co.uk.
(Continued)

*Primary Examiner* — Van D Huynh
(74) *Attorney, Agent, or Firm* — Knobbe, Martens, Olson & Bear LLP (57) ABSTRACT

Methods and systems for call processing are described. A call from a caller intended for a first party is received at a call processing system, which stores call signaling information associated with the call. A greeting is played to the caller, and a voice communication is received and recorded. At least a first portion of the voice communication is transmitted in substantially real time to a terminal associated with the first person. At least a portion of the voice communication is converted to text and the text is stored and transmitted to a terminal associated with the first party. When a search query is received from the first party, the system searches the data store to determine if there is matching call having related matching call information. If there is a matching call, related information may be provided to the first party.

23 Claims, 5 Drawing Sheets

Related U.S. Application Data continuation of application No. 13/614,532, filed on Sep. 13, 2012, now Pat. No. 8,526,582, which is a continuation of application No. 11/971,097, filed on Jan. 8, 2008, now Pat. No. 8,325,886.

(60) Provisional application No. 60/908,123, filed on Mar. 26, 2007.

(51) Int. Cl.
  *H04M 1/725* (2006.01)
  *G06F 17/30* (2006.01)
  *G06Q 30/02* (2012.01)

(52) U.S. Cl.
  CPC ...... *H04M 1/7255* (2013.01); *H04M 2201/40* (2013.01); *H04M 2201/60* (2013.01); *H04M 2203/4536* (2013.01); *H04M 2203/558* (2013.01)

(58) Field of Classification Search
  USPC .......................................... 379/88.14, 114.13
  See application file for complete search history.

(56) References Cited

U.S. PATENT DOCUMENTS

| | | | |
|---|---|---|---|
| 5,619,708 A | 4/1997 | Ho | |
| 5,651,054 A | 7/1997 | Dunn et al. | |
| 5,668,928 A | 9/1997 | Groner | |
| 5,729,741 A | 3/1998 | Liaguno et al. | |
| 6,175,622 B1 | 1/2001 | Chiniwala et al. | |
| 6,333,973 B1 | 12/2001 | Smith et al. | |
| 6,353,660 B1 | 3/2002 | Burger et al. | |
| 6,356,662 B1 | 3/2002 | Tsai | |
| 6,411,692 B1 | 6/2002 | Scherer | |
| 6,442,250 B1 | 8/2002 | Troen-Krasnow et al. | |
| 6,507,643 B1 | 1/2003 | Groner | |
| 6,606,373 B1 | 8/2003 | Martin | |
| 6,658,100 B1 | 12/2003 | Lund | |
| 6,661,785 B1 | 12/2003 | Zhang et al. | |
| 6,687,340 B1 | 2/2004 | Goldberg et al. | |
| 6,751,297 B2 | 6/2004 | Nelkenbaum | |
| 6,775,651 B1 | 8/2004 | Lewis | |
| 6,804,334 B1 | 10/2004 | Beasley | |
| 6,813,603 B1 | 11/2004 | Groner et al. | |
| 7,058,573 B1 | 6/2006 | Murveit et al. | |
| 7,065,186 B1 | 6/2006 | Myers et al. | |
| 7,085,716 B1 | 8/2006 | Even et al. | |
| 7,103,154 B1 | 9/2006 | Cannon et al. | |
| 7,136,462 B2 | 11/2006 | Pelaez | |
| 7,170,978 B2 | 1/2007 | Idren | |
| 7,191,135 B2 | 3/2007 | O'Hagan | |
| 7,206,389 B1 | 4/2007 | Dumoulin et al. | |
| 7,209,964 B2 | 4/2007 | Dugan et al. | |
| 7,302,539 B2 | 11/2007 | Korgaonkar et al. | |
| 7,310,601 B2 | 12/2007 | Nishizaki et al. | |
| 7,316,354 B2 | 1/2008 | Davis | |
| 7,319,742 B2 | 1/2008 | Levine | |
| 7,324,939 B1 | 1/2008 | Cardillo et al. | |
| 7,324,940 B1 | 1/2008 | Miller et al. | |
| 7,324,943 B2 | 1/2008 | Rigazio et al. | |
| 7,327,696 B1 | 2/2008 | Yarlagadda | |
| 7,327,723 B2 | 2/2008 | Kurganov | |
| 7,369,653 B2 | 5/2008 | Dezonno et al. | |
| 7,388,949 B2 | 6/2008 | Contractor et al. | |
| 7,400,711 B1* | 7/2008 | Ford ...................... | H04M 3/20 379/114.13 |
| 7,412,050 B2 | 8/2008 | Renner et al. | |
| 7,539,086 B2 | 5/2009 | Jaroker | |
| 7,647,350 B2 | 1/2010 | Parkinson et al. | |
| 7,702,792 B2 | 4/2010 | Shaffer | |
| 7,716,186 B2 | 5/2010 | Cannon et al. | |
| 7,826,605 B1 | 11/2010 | Vanier et al. | |
| 7,903,795 B2 | 3/2011 | Hiatt et al. | |
| 7,979,403 B2 | 7/2011 | Kedem et al. | |
| 8,208,796 B2 | 6/2012 | Prus et al. | |
| 8,214,338 B1 | 7/2012 | Kirchhoff | |
| 8,244,540 B2 | 8/2012 | Proux et al. | |
| 8,447,285 B1 | 5/2013 | Bladon et al. | |
| 8,582,729 B2 | 11/2013 | Minear | |
| 9,113,107 B2* | 8/2015 | Jolna ...................... | G06Q 30/02 |
| 2002/0176548 A1 | 11/2002 | Watts | |
| 2002/0178002 A1* | 11/2002 | Boguraev ............ | G06F 17/277 704/235 |
| 2003/0016792 A1 | 1/2003 | Skladman et al. | |
| 2003/0026393 A1 | 2/2003 | Skladman et al. | |
| 2003/0063731 A1 | 4/2003 | Woodring | |
| 2003/0123629 A1 | 7/2003 | Hussain et al. | |
| 2003/0142807 A1 | 7/2003 | Dolan et al. | |
| 2003/0220784 A1 | 11/2003 | Fellenstein et al. | |
| 2004/0076272 A1 | 4/2004 | Zafar et al. | |
| 2004/0105536 A1 | 6/2004 | Williams | |
| 2004/0190703 A1 | 9/2004 | Trandal et al. | |
| 2004/0240641 A1 | 12/2004 | Cohen et al. | |
| 2004/0252679 A1 | 12/2004 | Williams et al. | |
| 2005/0013419 A1 | 1/2005 | Pelaez | |
| 2005/0038698 A1* | 2/2005 | Lukose ............... | G06Q 30/0275 705/14.71 |
| 2005/0129206 A1 | 6/2005 | Martin | |
| 2005/0136955 A1 | 6/2005 | Mumick | |
| 2005/0141678 A1 | 6/2005 | Anders | |
| 2005/0171936 A1 | 8/2005 | Zhu | |
| 2005/0265322 A1 | 12/2005 | Hester | |
| 2006/0045255 A1 | 3/2006 | Peters et al. | |
| 2006/0058052 A1 | 3/2006 | Plestid et al. | |
| 2006/0143307 A1 | 6/2006 | Codignotto | |
| 2006/0168015 A1 | 7/2006 | Fowler | |
| 2006/0223502 A1 | 10/2006 | Doulton | |
| 2006/0234680 A1 | 10/2006 | Doulton | |
| 2006/0256934 A1 | 11/2006 | Mazor | |
| 2006/0282314 A1* | 12/2006 | Zamanian ............ | G06Q 30/02 705/14.43 |
| 2007/0054678 A1 | 3/2007 | Doulton | |
| 2007/0116194 A1 | 5/2007 | Agapi et al. | |
| 2007/0116204 A1 | 5/2007 | Doulton | |
| 2007/0117543 A1 | 5/2007 | Doulton | |
| 2007/0117544 A1 | 5/2007 | Doulton | |
| 2007/0117545 A1 | 5/2007 | Doulton | |
| 2007/0117546 A1 | 5/2007 | Doulton | |
| 2007/0117547 A1 | 5/2007 | Doulton | |
| 2007/0118357 A1 | 5/2007 | Kasravi | |
| 2007/0126875 A1 | 6/2007 | Miyamaki | |
| 2007/0127638 A1 | 6/2007 | Doulton | |
| 2007/0127657 A1 | 6/2007 | Shaffer et al. | |
| 2007/0127688 A1 | 6/2007 | Doulton | |
| 2007/0183405 A1 | 8/2007 | Bennett | |
| 2007/0201636 A1 | 8/2007 | Gilbert | |
| 2007/0217579 A1 | 9/2007 | Sobti et al. | |
| 2007/0245024 A1 | 10/2007 | Prus et al. | |
| 2007/0274465 A1 | 11/2007 | Othmer | |
| 2007/0280434 A1 | 12/2007 | Howell | |
| 2008/0109422 A1 | 5/2008 | Dedhia | |
| 2008/0140398 A1 | 6/2008 | Shpigel | |
| 2008/0177786 A1 | 7/2008 | Faisman et al. | |
| 2008/0178225 A1 | 7/2008 | Jost | |
| 2008/0229048 A1 | 9/2008 | Murase et al. | |
| 2008/0260114 A1 | 10/2008 | Siminoff | |
| 2009/0067586 A1 | 3/2009 | Fano et al. | |
| 2009/0080640 A1* | 3/2009 | Waalkes ............ | H04M 3/42221 379/265.06 |
| 2010/0184409 A1* | 7/2010 | Doulton ............... | H04L 12/5835 455/412.1 |
| 2011/0113343 A1 | 5/2011 | Trauth | |
| 2011/0196926 A1 | 8/2011 | Crawford | |
| 2011/0268260 A1 | 11/2011 | Madhavapeddi et al. | |

FOREIGN PATENT DOCUMENTS

| | | |
|---|---|---|
| JP | 11-506292 | 6/1999 |
| JP | 2001-168989 | 6/2001 |
| WO | WO 01/76210 | 10/2001 |

(56) References Cited

FOREIGN PATENT DOCUMENTS

OTHER PUBLICATIONS (2007) "Leave your text message after the beep . . . ," FT.com *Financial Times*.
Grenville, Mike (2006) "News: Mobile wins startup awards, 82ASK and Spinvox have both won Start Up Awards," *160Characters SMS & Mobile Messaging Association*.
Holahan, Catherine (2007) "The twitterization of blogs," *Business Week*.
La Monica, Paul R. (2007) "Leave your blog after the beep," CNNMoney.com, *Media Biz*.
Lee, Maggie (2006) "Not all talk: A strong coffee with the founders of speech-to-text telecom *Spinvox*," *European Business*.
Office Action for U.S. Appl. No. 12/046,305, dated Feb. 9, 2011.
Office Action for U.S. Appl. No. 12/046,305, dated Sep. 1, 2011.
Office Action for U.S. Appl. No. 12/113,733, dated Dec. 10, 2010.
Shannon, Victoria (2007) "The End User: A voice for the consumer, Speaking up to get online," *International Herald Tribune*, Web Site: http://www.iht.com.
Wides, Cara, "A new spin on messaging," Spotlight, Fone!, 2007.

* cited by examiner

CALLWAVE
Think Outside the phone

Welcome, Jamie Stone (310-555-1001)

[My Phonepage] [Contacts] [Call Archive] [Account] [Help] [Logout]

Recent Calls

| | | |
|---|---|---|
| ▶ ▫ Jack Hansen | Today 9:04am 2 sec | ⊗ |
| ▶ ⌂ Steve Jackson | Today 11:04am 12 sec | ⊗ |
| ⏸ ⌂ Joan Zimmerman | 7/29/08 10:24pm 10 sec | ⊗ |
| | (308) 555-7531 | |
| ▶ ▫ 805-536-2327 | 7/29/08 2:04pm 35 sec | ⊗ |
| ▶ ▫ Oprah W | 7/29/08 1:39pm 55 sec | ⊗ |
| ▶ ⌂ Jennifer Howard | 7/29/08 12:39pm 1 sec | ⊗ |
| ▶ ▫ Oprah W | 7/29/08 1:39pm 55 sec | ⊗ |
| ▶ ⌂ Jennifer Howard | 7/29/08 12:39pm 1 sec | ⊗ |
| ▶ ▫ Oprah W | 7/29/08 1:39pm 55 sec | ⊗ |
| ▶ ⌂ Jennifer Howard | 7/29/08 12:39pm 1 sec | ⊗ |

Contact        Create New Contact

Joan Zimmerman                    Edit
CareTech mobile (505) 555-5555  Call
home  (505) 555-1689  Call
email  JZmmerman@caretech.com
       123 Acme Dr.
       Santa Barbara, CA 93105
Note:  Friend to Jonathan Smith Send Phone Text to Joan Zimmerman:

Hi Joan. I'm listening to your message now while texting you back at the same time! This is call. See you soon.

[Send Text]

CallWave Fax-to-Email
The convenient way to get all of your faxes.
GET IT NOW
1st Month FREE!

METHODS AND SYSTEMS FOR MANAGING COMMUNICATIONS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

STATEMENT REGARDING FEDERALLY SPONSORED R&D

Not applicable.

PARTIES OF JOINT RESEARCH AGREEMENT

Not applicable.

REFERENCE TO SEQUENCE LISTING, TABLE, OR COMPUTER PROGRAM LISTING

Not applicable.

BACKGROUND OF THE INVENTION

Field of the Invention

The present invention is related to telecommunications, and in particular, to methods and systems for retaining, organizing, presenting, and responding to calls and messages.

Description of the Related Art

There is a wealth of information exchanged when people use their phones. Conventionally only a very limited part of this information is captured, in the form of messages, and usually only briefly while it is of immediate use and then it is discarded. Some of this information, such as pictures and contacts, may be retained longer, but it is difficult for the user to manage.

SUMMARY OF THE INVENTION

The present invention is related to telecommunications, and in particular, to methods and systems which can be utilized for retaining, organizing, presenting, and/or responding to calls, messages, and other objects.

An example embodiment provides a method of call processing, comprising: receiving at a call processing system a call from a caller intended for a first party; storing at least a portion of the call signaling information associated with the call in a computer readable medium; playing a greeting to the caller; receiving a voice communication from the caller; recording the voice communication from the caller; transmitting in substantially real time from the call processing system at least a first portion of the voice communication to a terminal associated with the first person; converting at least a portion of the voice communication to text; transmitting at least a portion of the voice communication text to a terminal associated with the first party; storing in a data store voice communication text for later access by the first party; receiving a search query from the first party; searching the data store to determine if there is matching call having related matching call information stored in the data store; and at least partly in response to determining that there is a matching call, providing information related to the matching call to the first party.

An example embodiment provides a method of managing telecommunications data, comprising: receiving a call from a caller intended for a first party; recording a voice message from the caller; automatically transmitting voice message text corresponding to at least a portion of the voice message to a terminal associated with the first party; and storing in a data store external to a mobile telephone associated with the first party voice message text for later access by the first party.

An example embodiment provides a method of processing a call comprising: receiving at a telecommunications processing system a first call; receiving a facsimile communication intended for a first person during the first call; converting at least a portion of the facsimile communication into a text message; storing at least a portion of call signaling information associated with the first call; storing the text message and/or an image file corresponding to the facsimile communication in a location accessible by the first person; and enabling the first user to search signaling information and/or the text of the facsimile message.

An example embodiment provides a method of processing a call comprising: receiving at a call processing system a first call from a caller intended for a first person including call signaling information; recording a voice communication from the caller; converting at least a portion of the caller's voice communication into text; transmitting a call notification regarding the first call to a terminal associated with the first person; enabling the first person to search at least a portion of the signaling information and/or the text; providing the first person with access to the text and at least a portion of the call signaling information; and enabling the first person to edit the text and/or call signaling information.

An example embodiment provides a method of processing a call comprising: transmitting a communication from a first person to a second person via a call processing system; storing routing information associated with the communication; enabling the first person and/or the second person to search the routing information; if the communication is a voice message, converting at least a portion of the voice communication to text and storing the text, if the communication is a facsimile message, converting at least a portion of the facsimile message to text and storing the facsimile text, enabling the first person and/or the second person to search the facsimile text; if the communication is a text communication, enabling the first person and/or the second person to search the text communication.

BRIEF DESCRIPTION OF THE DRAWINGS

Embodiments of the present invention will now be described with reference to the drawings summarized below. These drawings and the associated description are provided to illustrate example embodiments of the invention, and not to limit the scope of the invention.

DETAILED DESCRIPTION OF PREFERRED EMBODIMENTS

The present invention is related to telecommunications, and in particular, to methods and systems which can be utilized for retaining, organizing, presenting, and/or responding to calls, messages, and other objects.

As discussed above, there is a wealth of information exchanged when people use their phones. This trail of information often has long term value to the individual if it can be retained, organized, and made easily searchable. The information trail in effect expands a user's personal, searchable memory. Certain embodiments optionally store this information indefinitely or for an extended period of time.

In particular, certain embodiments provide methods and systems which enable a service provider to offer services that allow subscribers to store a collection of objects (e.g., calls and messages). These objects of interest to the subscriber are optionally accumulated as calls occur and messages are exchanged. Certain data/objects of interest are organized to be useful and are readily accessible to the subscriber from various devices. The data/objects are optionally retained indefinitely (or for an extended or designated period of time) in a reliable and accessible file store.

Retaining and organizing calls and messages improves a subscriber's overall communication experience, increasing the attractiveness and value to the subscriber of the service provider's telecommunications service offering. Further, optionally the data store for a subscriber is not available to other telecommunication service providers. Thus, because the secure personalized information is not available to another service provider, a subscriber would be less likely to switch to another service provider as this may result in a loss of access to the personalized information. Therefore, services described herein can act as a subscriber retention tool for a service provider as the subscriber would not want to lose access to the personalized information.

Certain embodiments of the call processing system described in the application provide call and message services using condition monitors/triggers, such as SS7 Advanced Intelligent Network (AIN) triggers. In an example embodiment, to support this service, the service provider configures a trigger at the appropriate points in an inbound and/or outbound call for a customer/subscriber. In an example embodiment, when a certain trigger fires, a call processing system (e.g., acting as a Service Control Point (SCP) in the SS7 network, and connecting calls from one phone line to another, using, for example, software running on a computer system), receives a query that enables the call processing system to control, at least in part, the call and optionally control the visual presentation of the call (or message) to the caller, and/or the called party.

In an example embodiment, enhanced call management and call routing services are provided via Common Channel Signaling (CCS) or Common Channel Interoffice Signaling (CCIS) information, such as, by way of example, via SS7 Intelligent Network (IN) triggers in the switches of local exchange telephone companies. For example, SS7 AIN triggers are set in the switches of carriers, such as Carrier Partners (e.g., carriers who are partners with a third party call processing operator in providing enhanced call processing services) to provide calling services. In another example, SS7 Wireless Intelligent Network (WIN) triggers are set in the mobile switches of wireless carriers, such as wireless carrier partners, to provide calling services. In another example, Non-Intelligent Network Signaling (e.g., ISDN, CLASS Call Forwarding services) is used to originate, terminate, forward, and bridge calls.

Throughout the following description, the term "Web site" or "Web" is used to refer to a user-accessible network site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically distributed computer systems that are appropriately linked together. Furthermore, while the following description relates to an embodiment utilizing the Internet and related protocols, other networks, such as networked interactive televisions, and other protocols may be used as well.

Further, while the following description refers to example network and telephony standards and protocols, other standards and protocols can be used as well. The term phone address can include a SIP address, a Skype address (or other peer-to-peer Internet telephony network address), a wireless phone number, an International number, an E.164 phone number, or other address. While Skype is referred to herein, other peer-to-peer telephony networks (e.g., having a decentralized and distributed user directory distributed among the nodes in the peer-to-peer telephony network) may be used as well. While certain phone addresses are referenced for purposes of illustration, other electronic addresses or locators can be used as well.

In addition, while reference may be made to electronic address books or contact lists, other data stores and formats can be used to store contact information. While certain intelligent network triggers are referred to herein, other triggers or events can be used as well. In addition, unless otherwise indicated, the functions described herein may be performed by executable code and instructions stored in computer readable memory and running on one or more processor-based systems. However, state machines, and/or hardwired electronic circuits can also be utilized. Further, with respect to the example processes described herein, not all the process states need to be reached, nor do the states have to be performed in the illustrated order. Further, certain process states that are illustrated as being serially performed can be performed in parallel.

Similarly, while certain examples may refer to a personal computer system or data device, other computer or electronic systems can be used as well, such as, without limitation, an interactive television, a networked-enabled personal digital assistant (PDA), a networked game console, a networked entertainment device, a smart phone (e.g., with an operating system and on which a user can install applications) and so on. While certain references are made to certain example system components or services, other components and services can be used as well. In addition, while certain user inputs are described as being provided via phone key presses or by clicking on a button, optionally, user inputs can be provides using other techniques, such as by voice or otherwise. While certain phone numbers are referenced for purposes of illustration, other phone numbers or electronic addresses or locators can be used as well.

While some examples refer to certain example messaging protocols (e.g., SMS or MMS) for illustrative purposes, other messaging protocols can be used as well (e.g., instant messaging, email, etc.).

In addition, certain call management capabilities described herein make use of a telecommunications client (e.g., a personal computer client, a client hosted on an interactive television, a network personal digital assistant, a smart phone, or a wireless phone with an Internet connection, etc.) to give the customer access to and management of calls (e.g., see example user interfaces illustrated in FIGS. 2-4) and messages left for the customer. Optionally, a customer can have multiple clients hosted on multiple computers or other hosts. The same or similar functionality is optionally provided via a Web browser interface.

In an example embodiment, the telecommunications client application (see FIG. 2) connects to and communicates with a call processing system via the Internet, an intranet, or other network. The client application, executing on a subscriber's computer terminal or other host, can make the subscriber's online presence known to the call processing system (e.g., by transmitting a message over the Internet to the call processing system). Optionally, the client can be used to receive, edit, and display call log data from the call processing system (e.g., a list of calls placed to/received by the subscriber, or placed by the subscriber, including phone numbers, caller or called party names, date/time of the call, an indication as to whether a call was an outbound/inbound call, the city/state of the caller/called party, type of call voice or fax, other call signaling information, etc.), and/or call alert data (e.g., for an active call, listing the caller phone number, name, city/state, and/or call status (e.g., ringing, playing greeting, recording caller message, terminating call, displaying fax)). Optionally, the call alert also plays an audible signal, such as a ring tone.

Figure 2:
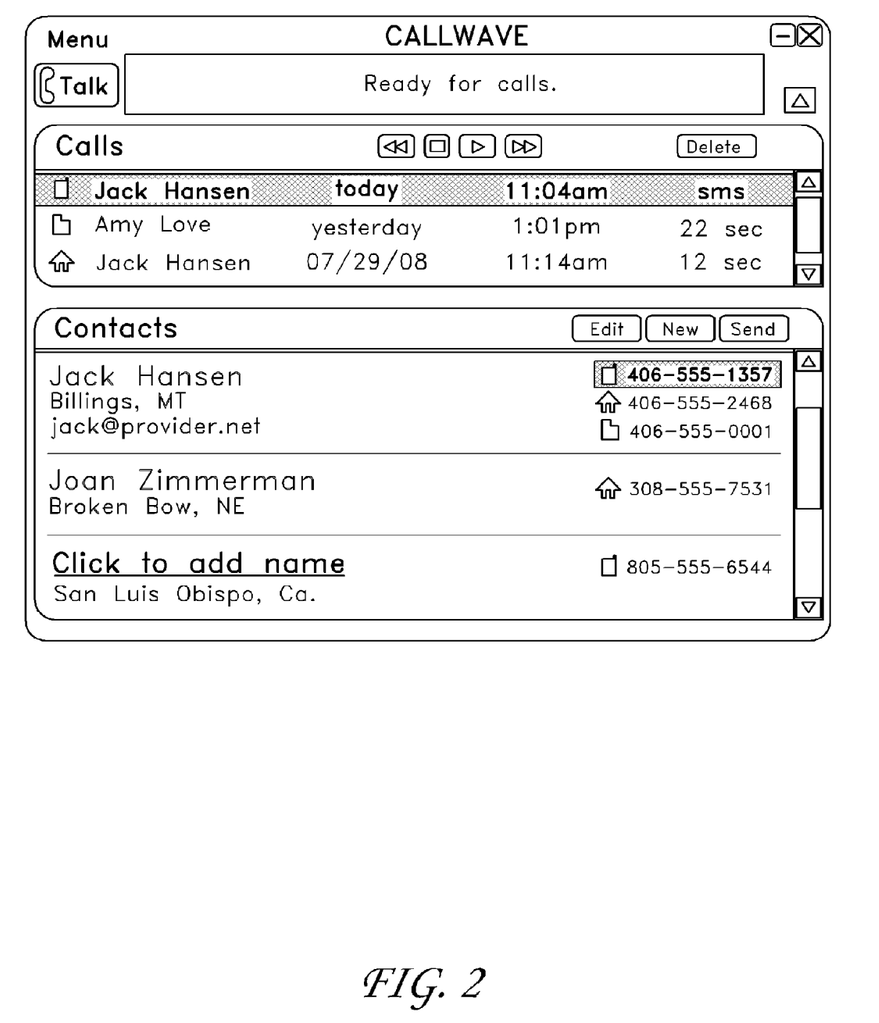
FIG. 2 illustrates a first example telecommunications client call log and user contact interface.

The client application can display a log of recorded messages from callers, and optionally can provide playback controls (e.g., play, fast forward, rewind) for playing back or displaying the recorded message (e.g., a voice message, a video message, a fax message, etc.) via the client computer terminal. The client optionally can also be used to screen calls (e.g., wherein the call processing system streams a message being left by a caller to the client so that the called party can listen to the message in substantially real time) and to instruct the call processing system to accept calls on the host computer terminal, forward calls, refuse calls, initiate call conferencing, and to otherwise provide call handling instructions. Options are also provided in the client to respond to calls using a text reply option and/or multimedia reply option. In addition, options are provided whereby a user can search their contact database and/or the web.

For example, when a call alert is received by the client, as part of call presentation, a ringing sound is optionally played via the client host. Optionally, the incoming call is displayed in a call alert user interface for a first amount of time (e.g., a set time, such as 5 seconds, or for a user configurable period of time), and then the call appears in the associated call log.

Figure 3:
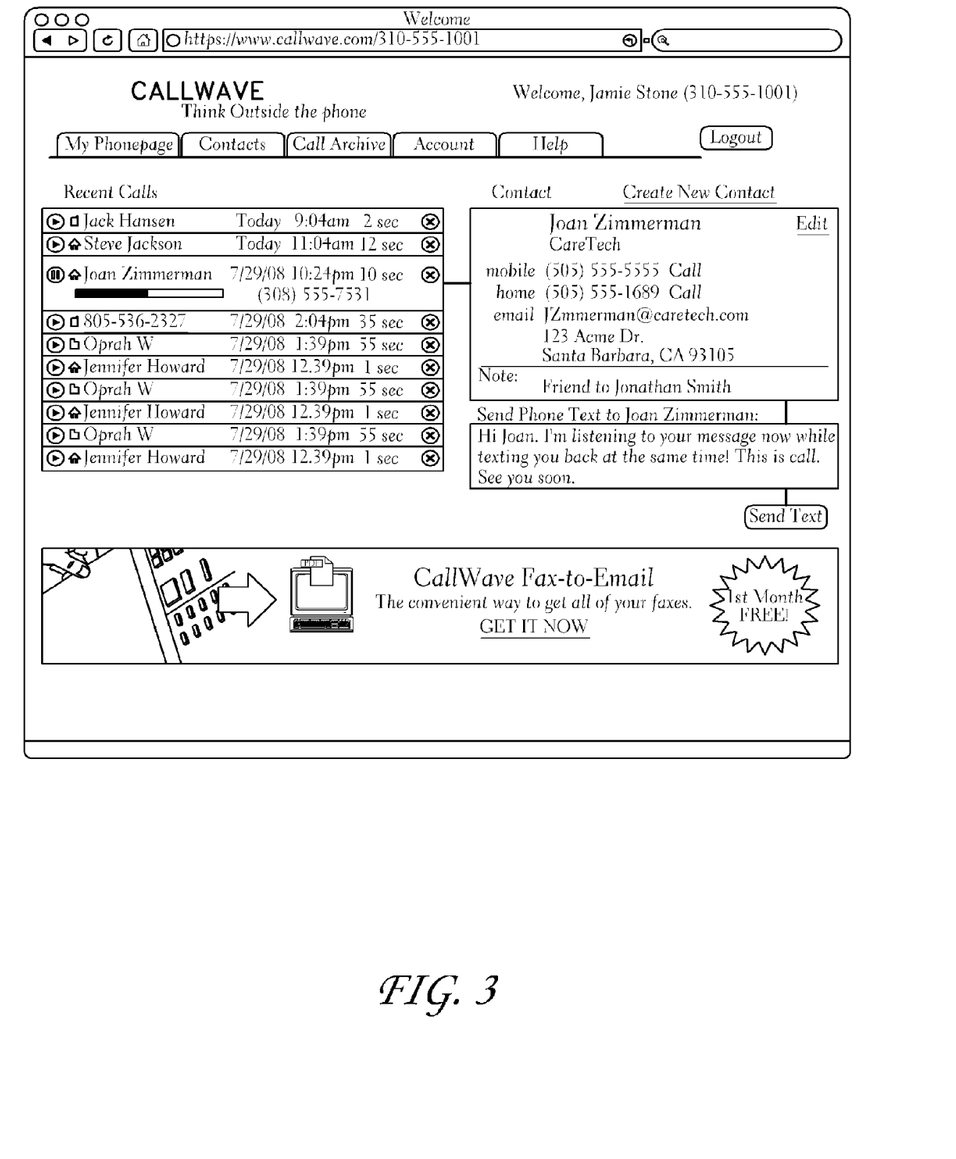
FIG. 3 illustrates a second example Web-based telecommunications client call log and user contact interface.

A telecommunications client is just an example user interface. FIG. 3 illustrates another example call log user interface presented via a browser to a customer. The browser can be executing on a computer terminal, such as a personal computer, a Wireless Application Protocol (WAP) or browser-enabled phone, a PDA or the like. The call log can be accessed by supplying the appropriate URL to the browser and optionally providing log-on information, such as a user name and a password.

Figure 4:
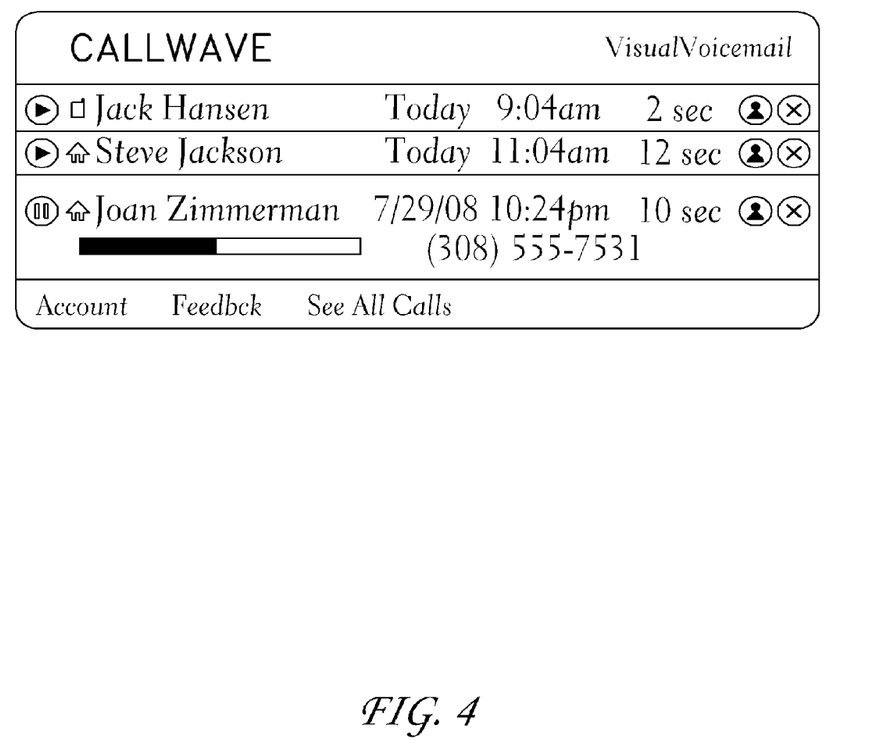
FIG. 4 illustrates a third example Widget-based telecommunications client call log user interface.

Some or all of the information and functionality provided by the user interfaces discussed can be provided by a widget or a gadget, FIG. 4. A widget can be in the form of a portable code that can be installed and executed within a Web page (e.g., an HTML-based web page) by an end user without requiring additional compilation. By way of illustration, a widget can be in the form of a window (with or without a border) with a particular appearance and behavior, a text box, a media player, etc. A widget can optionally accept and process user inputs. A gadget is equivalent to a widget that works in a Google framework. The term widgets can also encompass a badge, module, capsule, snippet, mini, or flake. Other types of applications can be used as well to provide the functionality of a widget or gadget.

The functionality, operation, and implementation for an example service retaining, organizing, presenting, and responding to calls, messages, other objects will now be described in further detail.

Figure 1:
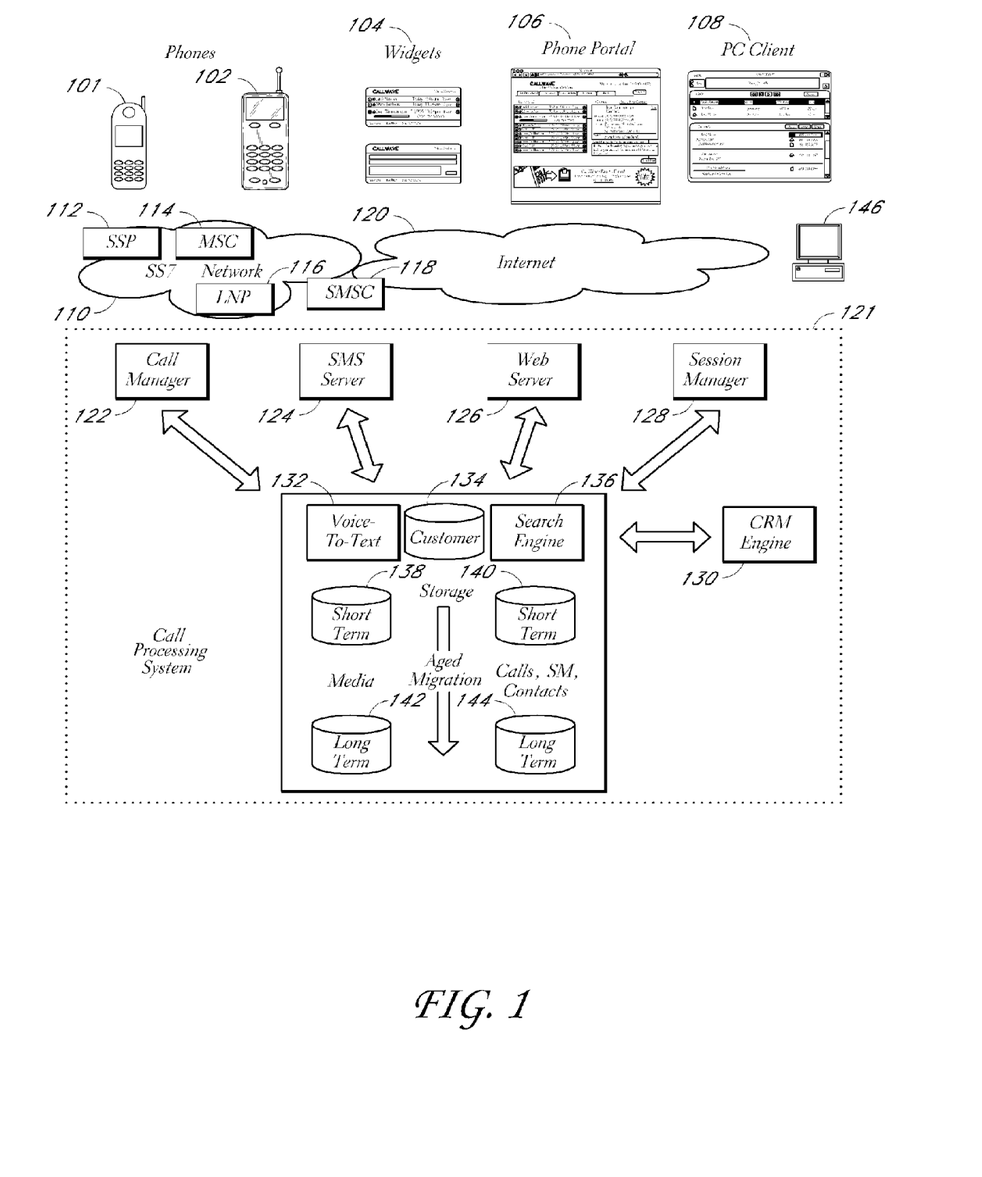
FIG. 1 illustrates an example network operating environment for advanced telecommunications services.

Glossary
AIN—Advanced Intelligent Network
CNAM—Calling Name
CP—Carrier Partner
IP—Intelligent Peripheral
LIDB—Line Information Database
LNP—Local Number Portability
MMS—Multimedia message service
MSC—Mobile Switching Center
SCP—Service Control Point
SMPP—Short Message Peer-to-Peer Protocol
SMS—Short Message Service
SMSC—Short Message Switching Center
SSP—Service Switching Point
SS7—Signaling System 7
TCAP—Transaction Capabilities Application Part
WIN—Wireless Intelligent Network FIG. 1 illustrates an example advanced telecommunications network environment. A service provider or carrier (e.g., a Carrier Partner) customer may have one or more landline or wireless phones 102 that connect to a local exchange switch, an SSP 112, or an MSC 114 in the carrier's network 110. The customer may also have one or more hosts (e.g., personal computers, networked televisions, personal digital assistants, smart phone, etc.) running a telecommunications client 108. In addition, a customer may have one or more phones connected to a broadband connection (e.g., via a cable modem or DSL modem) wherein the phone (e.g., an analog phone coupled to an analog phone adapter (ATA), a VoIP phone, a Skype phone, etc.) digitizes and packetizes voice data before transmitting over the broadband connection (e.g., using SIP, Skype/peer-to-peer, or other protocol) to a call routing service provider or other destination.

The telecommunications client 108 has one or more user interfaces that display some or all of the following: a call log, text messages (including transcribed voice message), a contact record/list, an optional automated character, and active, in-progress calls. The customer can elect to screen or take an active call or respond to a caller with a text message. Optionally, calls can also be made (originated) via the telecommunications client (e.g., where the host is equipped with a speaker and microphone). Optionally, information about a caller can be retrieved through a search function.

In this example, a call processing system 121 has a number of components, some of which are optionally centralized at a given location, others of which may be co-located in the carrier's network (e.g., to reduce network transport costs). An SCP is an optional AIN component that interacts with the SSPs (e.g., using the TCAP protocol). AIN triggers are armed for the customer's landline phone number/address/account so that when calls are made to or from that phone, a trigger fires and causes the SSP 112 to query the SCP for instructions on how to handle the call. The SCP is optionally also configured to perform TCAP queries to other SS7 components as needed by some services (e.g., request Automatic Callback from another carrier's switch when a line becomes idle).

In a non-AIN deployment, the call processing system 121 optionally interconnects with the PSTN using, by way of example, SS7 signaling. In this case, in an example embodiment, the SS7 signaling information associated with a call terminates on a Call Controller subsystem or the like, and the trunks (or bearer channels) terminate on one or more call managers (described further below). Optionally instead, the Call Controller subsystem and/or associated functions thereof, are included in a call manager subsystem 122.

In a VoIP deployment scenario, the call processing system 121 interconnects with the PSTN through an IP connection using, for example, Session Initiated Protocol (SIP) signaling. The IP network is optionally directly connected to Internet devices or calls are gatewayed from IP-to-PSTN at Network Points-of-Presence (NetPOP) which provide access points to the Internet.

In an example embodiment, SS7 WIN triggers are set in the mobile switches of wireless carriers (e.g., wireless carrier Partners) to provide similar calling services as described herein with respect to a landline phone for a customer's mobile phone number/address/account.

In an example embodiment, the call processing system 121 also contains one or more systems referred to as call managers 122. The call managers 122 are connected to the PSTN (e.g., via ISDN using the ISUP (ISDN User Part) protocol, by way of example, although other protocols can be used). The call managers 122 provide some or all of the following: provide a call screening service when screening is to be provided, record a message from a caller that is to be recorded, provide a voice prompt or message that is to be played to a caller and/or called party, record a facsimile document, detect speech or DTMF tones, convert speech that needs to be converted to text, and/or provide a gateway between the SS7-based networks (PSTN) and SIP-based networks (VoIP). The example call manager 122 optionally can also act as an IP (Intelligent Peripheral), another AIN component that the SCP can instruct the SSP to connect into the call for interaction with the called and calling party. The IP/call managers 122 and SCPs in the call processing system 121 optionally share a Call Registry that stores information about active calls.

The session managers 128 in the call processing system 121 optionally track telecommunication client presence and interact with a given telecommunications client (e.g., a client application hosted on a personal computer, PDA, smart phone, or a networked television) as call log, contact, and/or customer data needs to be synchronized with the centralized databases to provide the customer, via the client, with updated log, contact, and/or customer data. The session managers 128 also optionally provide the SCP in an AIN environment and call manager 122 in a non-AIN environment with service configuration information for the customer involved in a call. During an active call, the SCP and/or IP/call manager 122 optionally directly or indirectly interact with the telecommunications client 108, a phone portal 106, or a widget 104 to provide call progress information, provide message text, and to stream audio and/or visual content.

The call processing system 121 in this example contains centralized databases and/or a general-purpose storage area, optionally including, but not limited to, some or all of the following: a call log database, a contacts database, and a customer database 134. Optionally, the databases are not centralized and may be distributed geographically and/or over different systems. In this example, short term storage 138, 140, and long term storage 142, 144 may include one or more of the foregoing databases. Data stored in the short term storage may be copied or transferred to long term storage 142, 144 after a specified period of time or periodically. The long term storage 142, 144 may include, by way of example, optical storage, magnetic disk drives, and/or tape storage.

The call log database stores call events and related data for incoming and/or outgoing calls and text and/or multimedia messages. The contacts database stores information and parameters (e.g., names, identifiers, phone numbers/addresses, birthdays, notes, automated characters, and/or other information) associated with a sender, called, or calling party.

The customer database 134 stores information and parameters (e.g., account data, configuration information, and/or other information) associated with users (e.g., subscribers/customers). For example, a customer account can include an indication as to whether archive and phone management services provided via the call processing system 121 are to be enabled or displayed (e.g., wherein certain service packages and/or service prices do not include the archival and phone management service, and certain service packages and/or service prices include the archival and phone management service).

The call processing system 121 optionally includes other subsystems, such as some or all of the following: a router subsystem, which serves as an interface to the Internet 120 to manage communications between online IP client devices and call processing servers, an SMS server subsystem 124 which serves as a mail relay to transmit and receive SMS and MMS messages via an SMSC 118, a search engine 136 which can be used to search and sort archived calls, text and voice messages, contacts, and other kinds of phone related objects, a Customer Relationship Management (CRM) system 130 for monitoring and analyzing usage data and promoting new products and services and for providing related information to a operator terminal 146, a web server subsystem 126 to manage a "web site" associated with the call processing system 121 (e.g., via which a user can access an account set-up/configuration user interface, a call log, a contacts database, etc., using a browser or other network user interface), etc. These subsystems are optionally interconnected via a Local Area Network (LAN), a Wide Area Private Network (WAN), and/or a Wide Area Public Network (e.g., Internet).

A variety of different types of data can be stored by the call processing system 121, the carrier system, or other system, and the types of data that can be stored is not limited to examples described herein. The following list includes non-limiting example illustrative objects of the types of information that people can relate to and make long term use of, although fewer, additional and/or different types of information can be stored as well:

Call—the meta data associated with a phone call, such as, by way of example, some or all of the following: time, duration, disposition, and caller information (including but not limited to caller ID, caller Name, calling number, privacy restrictions); may also include capture (recording) of the call conversation.

Contact—information about a person with which the user interacts, such as, by way of example, how to reach them (e.g., phone address(es), SMS/MMS addresses, email address(es), instant messaging address(es), and/or other addresses), other personal information, such as a picture, title, birthday, relationship description, family members, etc.

Message—voice, fax, or text message that is exchanged and the associated meta data, and attachments such as pictures, files, music, videos, etc.

Picture—a picture (or video) that is taken with the phone or received from others.

Tune—music, such as a purchased piece of music with or without digital rights management.

Ring tone—a ring tone in general use or associated with a particular contact.

Greeting—a personal greeting for general use or associated with a particular contact.

Some of this content is valuable to store remotely from the user phone in that it backs up information that is currently in use on the user's phone (e.g., contact information). Other content is the kind that accumulates over time and contains items of information that is valuable to reference later.

Information of interest is accumulated as calls occur and messages are exchanged. The information is optionally also captured as part of routine synchronization with the phone handset via a wireless data connection (e.g., via a carrier network, WiFi, Blue Tooth, etc.) or via temporary wired connection to a computer, such as a personal computer or smart phone. Optionally, certain information is retrieved from SS7 network databases or other databases as part of a call.

Example areas of interaction where information is gathered on behalf of the user include some or all of the following, and/or other areas of interaction:

Voice Mail—Recorded voice mail. For example, voice mail may be recorded by a server when the called party is unavailable. By way of illustration, messages may be recorded when a call is forwarded to a server on a busy or no answer condition, or when a call directed to called party is otherwise answered by the server. Other caller information that is optionally captured and stored includes, when available, the caller phone address, and this in turn can be used to query a database (e.g., one or more of a SS7 CNAM database, a LIDB, a name cache, a contact address book, and/or other data store or source) to retrieve the caller name.

Fax Mail—This may be received in conjunction with a voice mail interaction or by a caller directly dialing (e.g., via a dedicated fax machine, a fax server, or a device emulating a dedicated fax machine) a virtual fax number. As similarly described above, information about the caller (whether voice or fax) is often available and can be obtained and stored.

Short Message—Short messages (e.g., SMS text messages/MMS multimedia messages) are exchanged, by way of example, with other phones, with computer (e.g., personal computer) users, and/or other devices capable of accessing and/or transmitting short messages. The messages may be, by way of example and not limitation, captured at SMSC level, and for interactions with a computer, the messages may be captured at the computer. Information about the sender may be a phone address or an email address. Additionally, an IM (instant messaging) chat interaction can be tracked and the chat communications and times recorded.

Phone Call—Information about inbound or outbound calls that do not result in a busy or no answer condition may be captured by intercepting the call using AIN or WIN triggers. This is non-intrusive, yet can provide full or partial information related to the call including phone information about the other party (e.g., the caller phone address, city/state, etc.), disposition of the call, and/or call duration. The triggers can also be used to establish a call leg by which the conversation can be conferenced with a call processing system and recorded if so desired.

Handset Synchronization—Synchronization software is optionally deployed (e.g., on the handset and/or a separate computer system/server) whereby data on the handset may be synchronized with the server. The synchronization may be originated by the handset or optionally by the server. Optionally, synchronization may be configured (e.g., via the handset or other system) to occur automatically when a relevant change is detected on the handset or when the handset is notified of a change in the data archive that originated from other sources. Optionally this may be restricted to occur only when in higher bandwidth settings, e.g., WiFi. Synchronization may be optionally invoked manually by the user. The data synchronized may optionally include some or all of the following: contacts, pictures, tunes, ring tones, music, movies, configuration information, etc.

Web or computer interfaces—The data that is archived may be optionally augmented from other sources (e.g., Outlook (or other personal information manger)), synchronization of contacts, or the data may optionally be directly altered by the user through Web and computer interfaces. The Web/computer interface may act as an extension of the phone handset in that, optionally, it can make direct use of the stored information and generate information that is stored there as a result of the user generating calls or messages from that device.

As discussed above, some of the information that is gathered directly is augmented with other related data. This optionally includes name information from the SS7 CNAM database and the current carrier owning a number from the SS7 LNP database 116. It optionally also includes address information (e.g., from an SS7 LIDB database). This data may be used to automatically populate all or a portion of a contact list for the user or may be used to search for and capture other information.

Some or all of the obtained data described above is organized to be useful and is made readily accessible to join various pieces of information of interest, (e.g., based on time, personal contact, thread of interaction, or search text). Some or all of the following techniques are optionally used to help organize the data and make it more accessible, examples of which are described below:

Voice-To-Text—Voice messages and conversations are converted to text (voice-to-text) via a voice-to-text engine 132 optionally using large vocabulary continuous speech recognition technology, by individuals transcribing speech, by individuals speaking clearly into speaker dependent or independent speech recognition subsystems, or some combination of the foregoing (e.g., a combination of automated recognition technology and manual transcription by a human). This may be performed as part of archiving and/or as part of initial message presentation. Optionally, the voice-to-text process is be configured to only do keyword spotting (e.g., to spot words specified in a keyword file defined by a subscriber and/or a system operator, which may include proper/family names (e.g., John, Jane, Mom, Dad, etc.), activity words (movie, dinner, gym, etc.), to convert only the lead-in text (e.g., the first specified number of words (the first 10, 20, or 30 words), or the words in a first time period (e.g., the first 5 seconds, 10 seconds, 15 seconds), or to convert the entire message. Conversion to text facilitates search and storage. Optionally, the text is indexed (e.g., using an inverted index, a forward index, or other index, optionally using compression to reduce the size of indices), wherein the index is searched in response to a query to speed search performance.

Optical Character Recognition (OCR)—OCR (software that translates text images into computer readable text) may be applied to fax messages to facilitate searching the fax messages and to make these messages more usable and optionally editable.

Object/Face Recognition—Pictures and/or videos may be analyzed to recognize objects and faces (e.g., using eigenface, fisherface, the Hidden Markov model, Dynamic Link Matching, and/or other technique), to assign names to the pictures, and to thus allow pictures to be categorized (e.g., by the system and or the subscriber) via the assignment of keywords and/or textual descriptions, and made searchable (e.g., by keyword/descriptive text).

Interaction Threads—One or more associations that relate a sequence of interactions is tracked for future reference. In certain example instances, such association may be via directly supplied subject information or via specific IM chat sequences. Optionally, the information is inferred based on times, parties involved, and/or the actual or converted text involved.

In an example embodiment, data is organized around the objects discussed above with respect to storage content. Data that has associated text can be searched using a text search (e.g., by entering one or more data strings into a search field, wherein the system will search for matches and display the search results to the user). Certain data is organized into lists that are naturally indexed by phone number and/or name and optionally these keys can be used to identify and access the desired data.

As similarly discussed above, optionally, all or a specified subset of information that is captured is stored indefinitely, until the user decides to delete it (optionally even subscriber deleted information is archived but hidden from the subscriber presentation), or for a time period specified by the user and/or the system. Optionally, by default the information is only permitted to be accessed by the user associated with the account for which data is being stored, but the user may optionally establish groups that are allowed to have access to specific information or to certain categories of information (e.g., the user's contacts or a specified subset thereof, the user's outgoing pictures, received pictures, and/or a subset thereof, the user's voice mail messages, or a subset thereof (e.g., those from certain specified callers)). The user may define the group using a corresponding user interface. For example, a user may activate a create group control, name the created group, and then in effect drag the shared information into that group (e.g., "dropping" the information onto a displayed group name or into a displayed group file). Optionally, some information is explicitly and optionally automatically designated or identified as private and may not be shared (e.g., some or all of copyrighted information, such as music, movies, etc.). Information about a caller that is marked restricted in the network (e.g., the caller phone address when the caller has Caller ID blocking) is optionally not shared with the called party/user but the user may tag information received from that person with their name once they know it.

In an example embodiment, the security and information usage policy is clearly communicated to the user at the outset to establish trust.

Given that storage is optionally indefinite, in such circumstances the storage is preferably large and reliable. In one embodiment, this is achieved with large redundant data farms with geographic separation, using RAID, and/or other techniques.

The stored/archived information is optionally made to be accessible from various devices including optionally a computer, a handset in voice mode or data mode, a networked television, and/or other device. The access method may be specific to a particular kind of information (e.g., a list of most recent calls, a list of contacts, or the text from a converted voice message to be sent in an SMS) or it may be very general (e.g., search for all interactions with a particular individual in a given timeframe that involved a particular subject). Thus, new, recently arrived information and/or relatively old information can be located and identified from the stored/data.

Optionally, device specific user interfaces may be used to access the stored/archived data discussed above. For example for a computer, interactive television, or smart phone, the user interfaces can be implemented as a widget, to a more traditional Web portal, to an executable client. For an example telephone handset, the interaction is tailored to the available display space, resolution and/or user input mechanism (e.g., keypad, full keyboard, touch screen, voice activation, etc.), where the functionality is optionally similar to the provided via the computer, although in some cases optionally reduced in scope. FIGS. 2-4 provide example embodiments of various user interfaces.

Additional optional ways in which the archived information may be utilized include some or all of the following:

Data synchronization is optionally provided which enables data (such as some or all of the data discussed above) from an archive to be accessed and/or utilized by a remote handset. For example, if user needs to search for contacts beyond the manageable number of contacts the handset can manage (e.g., wherein not all the contacts are stored on the handset), the system automatically reaches back into the archive stored remote from the handset to locate contacts stored in the archive based on user search terms or index selection (e.g., contacts beginning with the letter "A"). A user can similarly access archived call logs, message text, etc.

Text reply or call back to a call log entry automatically causes one or more databases (e.g., SS7 databases) to be queried if call log entry is older than a certain date. By way of example, if a call log entry or response to a search query is older than a year, the system may be configured to automatically query a database (e.g., an LNP database) to determine if the number has been ported to another carrier or has been provisioned to another user.

Accumulating usage information that can drive the Customer Relationship Management (CRM) engine. For example, some or all of the following information can be obtained, stored, and used to determine what telecommunication services one or more participants might be interested in:

who a subscriber has been calling;
who has called the subscriber;
how many people the subscriber has called;
how many long distances calls the subscriber has placed;
how many video calls the subscriber has placed/received;
how many calls have been to/from other subscribers of the carrier;
the duration of local and/or long distance calls;
the timing of calls (e.g., how many during prime hours, how many during non-peak hours/on weekends);
how many text message (e.g., SMS messages), multimedia messages (e.g., MMS messages) and/or photographs/videos the subscriber has sent and/or received;
etc.

Figure 5:
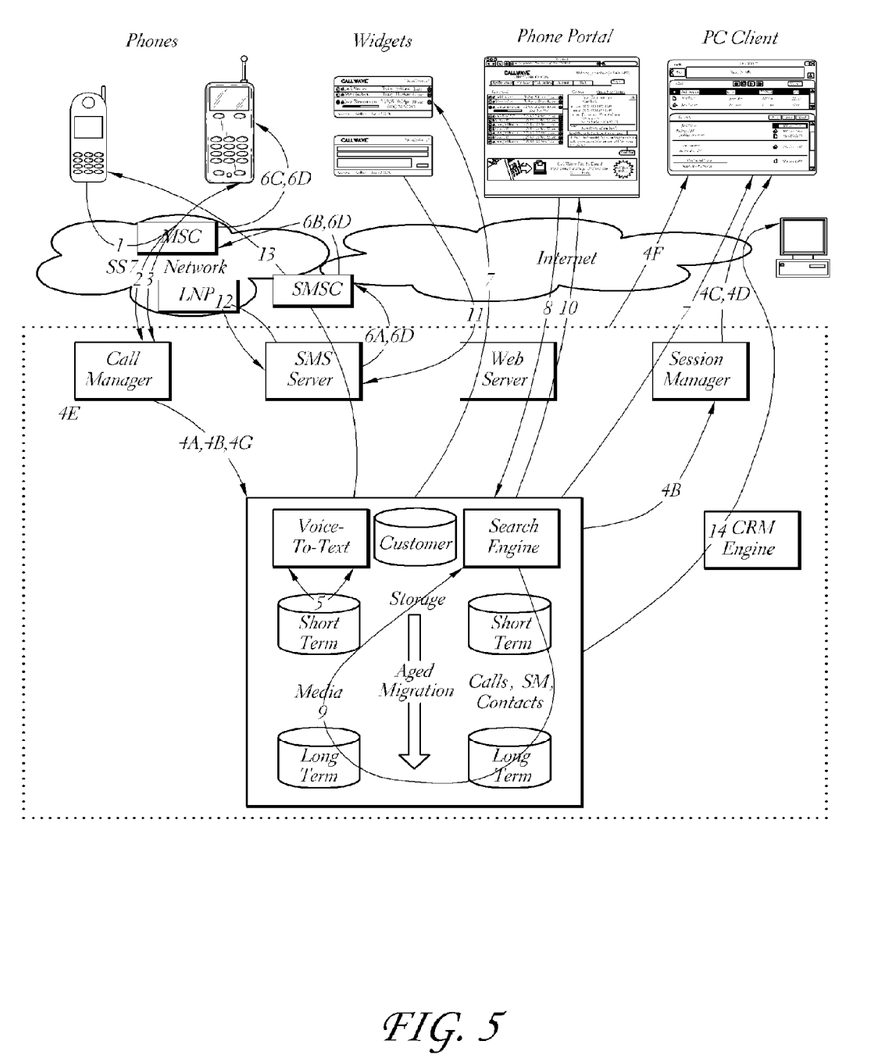
FIG. 5 illustrates an example operating environment/process for a call and text response.

FIG. 5 depicts an example embodiment in which an extensive storage architecture is utilized to provide a service to a wireless subscriber of a carrier (e.g., a Carrier Partner). In this example embodiment, a caller calls a subscriber's mobile phone, the caller records a message on a voice answering service hosted by a server, transcribes the message, and the subscriber receives a transcription of the message. Later, the subscriber utilizes the extensive storage architecture to search for a personal call and replies to the call using text. The carrier mines/analyzes the archive and, based on the subscriber's usage, sends a message (e.g., a CRM message) to the subscriber promoting a service that would be of interest to the subscriber (e.g., where the service is related to message content and/or the subscriber's utilization of call related services). The example process is described below.

State 1.

A Caller dials the subscriber's mobile phone number/address (or other phone-type address). This call is routed through the PSTN to a carrier (e.g., a CP). In this example embodiment, the caller places a call to the subscriber's mobile phone. The call routes through the SS7 network to the Mobile Switching System (MSC) currently serving the subscriber.

State 2.

The MSC detects a condition, (e.g., a WIN trigger set on the subscriber's phone address) and transmits a message over a network to the call manager so that the call manger can log the call and/or perform alternate routing. Optionally, the message transmission occurs whether or not the call eventually gets conditionally forwarded on a busy or no answer condition.

State 3.

The subscriber does not answer after a specified number of rings or amount of time. This no answer condition is detected by the MSC and causes the MSC to forward the call to the call manager (an enhanced service provider platform and/or call processing system) in accordance with a previously configured forwarding configuration. In the forwarded call, the MSC includes some or all of the call signaling information associated with the call, including, for example, the caller phone number/address, a privacy indicator, a designation of whether the call was a forwarded call, and/or the called party identifier (e.g., phone number/address or account number).

State 4A.

The receiving call manager verifies the called phone address is that of a customer (e.g., a subscriber of a service offered by the operator of the call processing system and/or other entity having an account associated with the call processing system), optionally by determining if the called phone address or other identifier associated with the called party matches a customer number in the customer database (which stores customer account records).

State 4B.

The call processing system queries the session manager to obtain some or all of the following: service configuration for the customer being called, the customer's call location, the customer's online status (e.g., online or offline with respect to a data network, such as the Internet), and contact information for the caller.

State 4C.

Optionally, the session manager notifies the customer's telecommunications client (e.g., a Widget, a phone portal page, or telecommunication client as shown in FIG. 5), if online, that there is an incoming call. The client displays the call in its active call window (e.g., a call alert user interface) with the status set to "ringing". A "Take Call" button on the telecommunications client is available to the customer to take action on the call (e.g., establish duplex communications with the caller, transfer the call, etc.).

State 4D.

The call manager begins playing a greeting (e.g., a canned greeting or a greeting prerecorded by the customer, such as one that states the customer's name and/or asks the caller to leave a message) to the caller and the call processing system notifies the telecommunications client to cause the active call display to show "greeting caller".

State 4E.

The call manager plays a record tone and begins recording a message from the caller.

State 4F.

The call manager notifies the telecommunications client to change the active call display to "recording". The call manager then begins streaming the audio over the Internet to be played by the telecommunications client in substantially real-time.

State 4G.

The call manager records a message and stores it in memory (e.g., in association with the subscriber's account or other subscriber identifier). The call manager logs the call and optionally updates the call frequency information for the contact (e.g., the call manager tracks the total number of calls received from a given phone address and/or caller, wherein the "total number of calls" can be the total number of calls received from a specific date, within a specified time period, or otherwise). The telecommunications client or call log web page clears the active call display and optionally adds the call to the top of the call log. This is a new caller for this subscriber so the call manager also queries a database (e.g., the CNAM database in the SS7 Network) to get the name associated with the calling phone address and then automatically creates a new contact if one does not already exist for the calling phone address.

State 5.

The voice message is transcribed to text (automatically or optionally in whole or in part by a human) and stored in a call processing system database in association with a subscriber identifier. Optionally, one or more transcription passes are applied to the voice message. For example, a first pass transcription is applied to get the gist of the message or enough information (e.g., the first 10 seconds (or other specified time period) of the message and/or the last 10 seconds of the message) to communicate in a short message including the text (e.g., an SMS or MMS message). A second pass or full transcription follows in the background and the voice and text message is archived in a storage system. Optionally, a per caller contact database is queried to determine if the message should be transcribed to text or not.

State 6A.

In this example, the subscriber is notified of the call and message on their wireless phone via SMS. The message contains text giving the gist of the voice message, e.g., urgency, call to action, recorded phone address. A Short Message Service or MMS service within the call processing system composes a Short Message (SM) or a multimedia message (MM), addresses it to the customer's mobile phone (or other device capable of receiving Short Messages or an MM designated by the subscriber via the telecommunications client or via the account management Web page) and sends the message to an SMSC. The session manager optionally stores a copy of the message in a data base or file system associated with the customer's account.

State 6B.

The SMSC transmits the received message to the MSC.

State 6C.

The MSC transmits a notification to the subscriber's mobile phone informing the mobile phone (or other designated communications device) there is a message waiting.

State 6D.

A Message Waiting Indicator (MWI) update is transmitted (e.g., using an SMPP interface over a data network) to update the MWI icon on the wireless phone to indicate that there is a message waiting.

State 7.

In this example, the subscriber is also alerted of the call via a Voice Mail Widget and/or computer client (which are optionally CP branded) on all or a selection portion of the subscriber's computers that are online and have their corresponding widget and/or client running.

State 8.

At a later date (e.g., a year later), the subscriber needs to get back in touch with the caller. In this example, the subscriber accesses their Carrier Partner branded phone portal (or other branded or non-branded interface) which among other features and services includes an archive (or access to an archive) of the subscriber's calls, messages, and contacts. By way of example, the subscriber could access the Phone Portal by clicking on a Widget control which presents their Carrier Partner branded Web Phone Portal. From the Portal, the subscriber optionally initiates a search or sort on their organized calls, messages, and/or contacts.

State 9.

The Web Server provides the search text provided or selected by the subscriber to the Search Engine so that it can quickly find relevant voice and text messages and/or contacts. In this example the search spans both short term and longer term storage. Optionally, the subscriber can limit the search to certain date ranges, communication initiators (e.g., to a certain caller or called party; a certain text message originator or recipient, etc.) and data sources.

State 10.

In response to the search request, the search engine generates a list of search results (optionally ordered by relevancy, with the most relevant listed first or by date, where the subscriber can optionally specify the ordering to be used) and transmits the results to the subscriber. The subscriber is presented in a user interface with the results or a portion thereof (e.g., the relevant messages). For voice messages, the text is also displayed and the cursor can be moved to a desired point in the displayed text to start playing the voice message. Thus, the text can act as an index to the corresponding voice message.

State 11.

The subscriber decides to send a text message to the caller after reviewing the results response from the search request. The subscriber in this example decides to send a text message using their SMS Widget. Optionally there is an automated interaction from the Web Phone Portal which prepopulates the subscriber's SMS Widget or the user selects a control from the Web Phone Portal which launches an SMS Widget or equivalent user interface. The message send request is transmitted over a network from the SMS widget client through the Web Server to the SMS Server.

State 12.

The SMS Server queries a database (e.g., the LNP database in the SS7 Network) to determine the current carrier, as the original caller may have ported to another carrier.

State 13.

The SMS Server transmits the message for delivery to the original caller/contact's wireless phone via the SMSC. The SMS Server logs the transaction including the text of the message. The text log is available to the subscriber for later review, search, and sorting.

State 14.

In this example embodiment, based on an analysis of logged activity for the subscriber, the CRM Engine notices a usage pattern (e.g., who the user has been calling, who has called the user, how many people the user has called, how many long distances calls the user has placed, how many video calls the user has placed/received, how many calls have been to/from other subscribers of the carrier, the duration of local and/or long distance calls, the timing of calls (e.g., how many during prime hours, how many during non-peak hours/on weekends), how many text messages or multimedia messages (e.g., SMS or MMS messages) and/or photographs/videos the user has sent and/or received, etc.) that matches the market profile for a new service the carrier (e.g., a Carrier Partner) is offering, so the call processing system sends an email or SMS message, or displays a message in the widget, Phone Portal, or telecommunications client to that subscriber encouraging them to try it out, optionally on a free trial basis. For example, the service may be a call-related service and/or a different rate plan then that the subscriber is currently under.

While the above examples refer to calls forwarded to the call processing system (e.g., on a ring-no-answer, busy, or call forward all condition), the calls optionally could have been placed to a virtual phone number associated with the customer and "owned" by the call processing system, so that calls to the virtual phone number are received at the call processing system without needing to be forwarded (e.g., which terminates directly on the call processing system). Further, while certain of the above examples refer to transmission of an SMS message over a mobile network to a customer mobile phone, other message types (e.g., email or instant messages) can be transmitted over other types of networks (e.g., an Internet protocol network) or other device types (e.g., an Internet protocol phone).

It should be understood that certain variations and modifications of the systems and processes described herein would suggest themselves to one of ordinary skill in the art. The scope of the present invention is not to be limited by the illustrations or the foregoing descriptions thereof.

What is claimed is:

1. A call processing system comprising:
    at least one computer processor; and
    non-transitory memory, which is operably connected to the at least one computer processor, and embodied with a computer program comprising instructions that when executed by the at least one computer processor cause the call processing system to perform operations comprising:
    receiving a call over a network from a caller directed to a first user device of a user of the call processing system;
    converting at least a portion of a caller's voice communication associated with the call into a voice communication text;
    identifying a subset of words in the voice communication text;
    analyzing at least the content of the identified subset of words of the voice communication text; and
    promoting to the user of the call processing system, to whom the call was intended, one or more products, services, or products and services via a displayed user interface of an application on a second user device distinct from the first user device to which the received call was directed, based at least in part on the analysis of the content of the identified subset of words of the caller's voice communication text.

2. The call processing system as defined in claim 1, the call processing system further configured to perform operations comprising: enabling the user of the call processing system, to whom the call was intended, to search the voice communication text for one or more search terms specified by the user of the call processing system.

3. The call processing system as defined in claim 1, the call processing system further configured to perform operations comprising:
enabling the user of the call processing system, to whom the call was intended, to search the voice communication text for one or more search terms specified by the user of the call processing system via a search query;
obtaining search results, corresponding to the search query from the user of the call processing system, wherein the search results include at least a portion of the voice communication text; and
enabling the search results, including at least the portion of the voice communication text, to be provided for display to the user of the call processing system.

4. The call processing system as defined in claim 1, the call processing system further configured to perform operations comprising:
receiving call signaling information associated with the received call;
enabling the user of the call processing system, to whom the call was intended, to search the voice communication text for one or more search terms specified by the user of the call processing system via a search query;
obtaining search results corresponding to the search query from the user of the call processing system, wherein the search results include at least a portion of the voice communication text,
enabling the search results, including at least the portion of the voice communication text, to be provided to a user device for display to the user of the call processing system; and
enabling at least a portion of the call signaling information associated with the call to be provided to the user device for display to the user of the call processing system in association with the search results.

5. The call processing system as defined in claim 1, wherein converting at least a portion of a caller's voice communication associated with the call into a voice communication text comprises converting the entire caller's voice communication into voice communication text.

6. The call processing system as defined in claim 1, the call processing system further configured to perform operations comprising:
enabling the user of the call processing system to:
assign a name in a contact record associated with the caller, or
edit a name in a contact record associated with the caller, or
assign and edit a name in a contact record associated with the caller.

7. The call processing system as defined in claim 1, wherein the identification of the subset of words of the voice communication text is based at least in part on one or more keywords.

8. The call processing system as defined in claim 1, wherein the identification of the subset of words of the voice communication text is based at least in part on one or more keywords and the one or more keywords include activity words.

9. The call processing system as defined in claim 1, the call processing system further configured to perform operations comprising: enhancing search performance at least in part by indexing the identified subset of words of voice communication text.

10. The call processing system as defined in claim 1, the call processing system further configured to perform operations comprising:
storing the caller's voice communication in a first storage archive; and
subsequent to the storing of the caller's voice communication in a storage archive, storing the caller's voice communication in a long term storage archive.

11. A communications processing system comprising:
at least one computer processor; and
non-transitory memory, which is operably connected to the at least one computer processor, and embodied with a computer program comprising instructions that when executed by the at least one computer processor cause the communications processing system to perform operations comprising:
recording, during a call originally directed to a first device, an audio message from a calling party intended for a user of the communications processing system;
converting at least a portion of the recorded audio message into a voice communication text;
identifying a subset of words in the voice communication text;
analyzing at least the content of the identified subset of words of the voice communication text; and
promoting to the user of the communications processing system, to whom the audio message was intended, one or more products, services, or products and services via a displayed user interface of an application on a second user device, the second user device distinct from the first user device to which the call from the calling party was originally directed, based at least in part on the analysis of the content of the identified subset of words of the party's voice communication text.

12. The communications processing system as defined in claim 11, the communications processing system further configured to perform operations comprising: enabling the user of the communications processing system, to whom the recorded audio message was intended, to search the voice communication text for one or more search terms specified by the user of the communications processing system.

13. The communications processing system as defined in claim 11, the communications processing system further configured to perform operations comprising:
enabling the user of the communications processing system, to whom the recorded audio message was intended, to search the voice communication text for one or more search terms specified by the user of the communications processing system via a search query;
obtaining search results, corresponding to the search query from the user of the communications processing system, wherein the search results include at least a portion of the voice communication text; and
enabling the search results, including at least the portion of the voice communication text, to be provided to a user device for display to the user of the communications processing system.

14. The communications processing system as defined in claim 11, wherein converting at least a portion of the recorded audio message into a voice communication text comprises converting the entire recorded audio message into a voice communication text.

15. The communications processing system as defined in claim 11, the communications processing system further configured to perform operations comprising:
enabling the user of the communications processing system to:

assign a name in a contact record associated with the party, or edit a name in a contact record associated with the party, or assign and edit a name in a contact record associated with the party.

16. The communications processing system as defined in claim 11, wherein the identification of the subset of words of the voice communication text is based at least in part on one or more keywords.

17. The communications processing system as defined in claim 11, wherein the identification of the subset of words of the voice communication text is based at least in part on one or more keywords and the one or more keywords include activity words.

18. The communications processing system as defined in claim 11, the communications processing system further configured to perform operations comprising: enhancing search performance at least in part by indexing the identified subset of words of voice communication text.

19. A communications processing system comprising:

at least one computer processor; and non-transitory memory, which is operably connected to the at least one computer processor, and embodied with a computer program comprising instructions that when executed by the at least one computer processor cause the communications processing system to perform operations comprising:

receiving an audio recording from a calling party intended for a user of the communications processing system;

converting at least a portion of the received party's audio recording into a voice communication text;

identifying a subset of words in the voice communication text;

analyzing at least the content of the identified subset of words of the voice communication text; and promoting to the user of the communications processing system, to whom the received audio recording was intended, one or more products, services, or products and services via a displayed user interface of an application on a second user device, the second user device distinct from a first user device to which the audio recording was directed, based at least in part on the analysis of the content of the identified subset of words of the party's voice communication text.

20. The communications processing system as defined in claim 19, the communications processing system further configured to perform operations comprising:

enabling the user of the communications processing system, to whom the audio recording was intended, to search the voice communication text for one or more search terms specified by the user of the communications processing system via a search query;

obtaining search results, corresponding to the search query from the user of communications processing system, wherein the search results include at least a portion of the voice communication text; and enabling the search results, including at least the portion of the voice communication text, to be provided for display to the user of the communications processing system.

21. The communications processing system as defined in claim 19, converting at least a portion of the received party's audio recording into a voice communication text comprises converting the entire received party's audio recording into voice communication text.

22. The communications processing system as defined in claim 19, wherein the identification of the subset of words of the voice communication text is based at least in part on one or more keywords.

23. The communications processing system as defined in claim 19, wherein the identification of the subset of words of the voice communication text is based at least in part on one or more keywords and the one or more keywords include activity words.

* * * * *